US006548191B2

(12) United States Patent
Osame et al.

(10) Patent No.: US 6,548,191 B2
(45) Date of Patent: Apr. 15, 2003

(54) FILLER WIRE FOR LASER-WELDING ALUMINUM ALLOY MEMBER, METHOD OF WELDING ALUMINUM ALLOY MEMBER BY USING THE FILLER WIRE, AND WELDED-ALUMINUM ALLOY MEMBER PRODUCED BY USING THE FILLER WIRE

(75) Inventors: Yasuhiro Osame, Tochigi (JP);
Takenori Hashimoto, Tochigi (JP);
Kenji Tsushima, Yokohama (JP);
Hiroki Sakamoto, Yokohama (JP);
Kenji Suzuki, Yokohama (JP)

(73) Assignees: Nissan Motor Co., Ltd., Kanagawa (JP); Showa Denko KK, Tokyo (JP)

( * ) Notice: Subject to any disclaimer, the term of this patent is extended or adjusted under 35 U.S.C. 154(b) by 0 days.

(21) Appl. No.: 09/878,208

(22) Filed: Jun. 12, 2001

(65) Prior Publication Data

US 2002/0012810 A1 Jan. 31, 2002

(30) Foreign Application Priority Data

Jun. 12, 2000 (JP) ........................................ 2000-175258

(51) Int. Cl.⁷ ........................ B32B 15/20; B23K 26/00; B23K 35/22

(52) U.S. Cl. ............................ 428/654; 75/302; 148/23; 148/26; 219/121.6; 219/121.61; 219/121.63; 219/121.64; 219/121.76; 219/121.77; 219/145.1; 219/145.22; 219/145.23; 219/146.22; 428/613; 428/385; 428/689; 428/696; 428/934

(58) Field of Search .................................. 428/654, 613, 428/385, 689, 696, 934; 75/302; 148/23, 26; 219/121.6, 121.61, 121.63, 121.64, 121.76, 121.77, 145.1, 145.22, 145.23, 146.22

(56) References Cited

FOREIGN PATENT DOCUMENTS

| JP | 6-30480 A | * 11/1994 |
| JP | 6-304780 | 11/1994 |
| JP | 7-96396 | 4/1995 |

* cited by examiner

Primary Examiner—Robert R. Koehler
(74) Attorney, Agent, or Firm—McDermott, Will & Emery (57) ABSTRACT

A filler wire for laser-welding an aluminum alloy is described, which comprises a base material of Aluminum-Silicon based alloy and a flux of Aluminum-Potassium-Fluorine-based composition. The amount of the flux in the base material is greater than 0 (zero) wt. % and less than approximately 1.0 wt. %.

13 Claims, 5 Drawing Sheets

FILLER WIRE FOR LASER-WELDING ALUMINUM ALLOY MEMBER, METHOD OF WELDING ALUMINUM ALLOY MEMBER BY USING THE FILLER WIRE, AND WELDED-ALUMINUM ALLOY MEMBER PRODUCED BY USING THE FILLER WIRE

BACKGROUND OF THE INVENTION

1. Field of the Invention

The present invention relates in general to a welding technique applied to aluminum alloy members, and more particularly to a filler wire for laser-welding aluminum alloy members, a method for welding the aluminum alloy members by using the filler wire and a welded aluminum alloy member produced by using the filler wire.

2. Description of the Related Art

In road motor vehicles, reduction in weight of the vehicle body is one of the effective measures to achieve an improved fuel efficiency. In view of this, in place of the conventionally used steel, usage of aluminum alloy members as the vehicle body has been frequently attempted in these days. Furthermore, in order to reduce the cost of the aluminum alloy-produced vehicle body and improve the productivity of the same, some parts of them, such as couplings for the space frame, B-pillars and the like, have been produced of aluminum alloy die castings through a vacuum die casting method. For uniting these aluminum alloy parts, arc welding (such as MIG (metal inert gas) welding or the like), laser welding and riveting have been usually employed. When uniting the aluminum alloy parts is carried out by using the MIG welding or the laser welding wherein a high density energy is used as a heat source, generation of undesired blowholes (viz., porosity) tends to easily occur as compared with a case of uniting steel parts. Of course, presence of such blowholes lowers the mechanical strength and ductility of the welded portions of the aluminum alloy parts.

It has been revealed that most of the blowholes originates from hydrogen gas produced during the welding. This is because when being melted, the aluminum alloy shows a high solubility or holding ability to hydrogen, and such hydrogen solubility of the alloy lowers as the temperature lowers.

Furthermore, due to inevitability possessed by the production method, the aluminum alloy die casting parts have a marked amount of air contained therein. When the aluminum alloy die casting parts are subjected to welding, the air in the parts is forced to escape therefrom, which causes easy generation of the blowholes as compared with a case wherein the welding is applied to aluminum alloy parts produced through an extrusion method.

In order to restrain and reduce generation of such blowholes in the welded portions of the aluminum alloy die casting parts, optimization of welding conditions, such as cleaning the portions to be welded, finding an optimum welding speed and an optimum flow rate of shielding gas and the like, has been hitherto carried out. In addition to this, the amount of gas led into the parts during the production process has been severely controlled.

SUMMARY OF THE INVENTION

However, the above-mentioned optimization of welding conditions tends to sacrifice the productivity of the vehicle body due to the prime needing with which the quality of the welded portions is considered. Furthermore, in order to control the gas amount in the aluminum alloy die casting parts, very skilled and thus costly technique is needed for assuring the quality of the die casting parts. In fact, hitherto, solving the above-mentioned shortcomings has been one major theme in the field of welding technique of aluminum alloy parts.

The theme on the above-mentioned blowhole generation brings about a similar theme in another field where the surface of an aluminum alloy part is refined by using, as a heat source, MIG arcing or electron beam irradiation which has a high density energy. In this field, as a welding material that can suppress generation of blowholes in case of carrying out the surface refining of the aluminum alloy part, Japanese Patent First Provisional Publication 6-304780 shows a welding aluminum wire (viz., filler wire) which contains therein 0.1 to 8 wt. % of a flux which comprises 5 to 10% of sodium (Na), 40 to 45% of potassium (K), less than 5% of oxygen (O), less than 5% of sulfur (S), 5 to 10% of fluorine (F) and 35 to 40% of chlorine (Cl). Furthermore, Japanese Patent First Provisional Publication 7-96396 shows an aluminum filler material for welding, which contains 0.05 to 20 wt. % of $C_2Cl_6$ in powder form. However, even these publications provide substantially no description about a filler wire which exhibits a sufficient control effect against generation of the blowholes during welding of the aluminum alloy die casting parts.

In view of the above-mentioned task, one object of the present invention is to provide a filler wire used for welding aluminum alloy parts, particularly for welding aluminum alloy die casting parts, which can sufficiently control or restrain generation of the undesired blowholes during welding of them.

Another object of the present invention is to provide a method for welding aluminum alloy die casting parts by using such filler wire.

Still another object of the present invention is to provide a welded-aluminum alloy part made by using the filler wire.

According to a first aspect of the present invention, there is provided a filler wire for laser-welding an aluminum alloy, which comprises a base material; and a flux of Al—K—F (viz., Aluminum-potassium-fluorine)-based composition, wherein the amount of the flux in the base material is greater than 0 (zero) wt. % and less than approximately 1.0 wt. %.

According to a second aspect of the present invention, there is provided a method of welding a work piece of aluminum alloy, which comprises preparing a work piece of aluminum alloy; and laser-welding the work piece by using a filler wire, the filler wire comprising a base material and a flux of Al—K—F (viz., Aluminum-potassium-fluorine)-based composition, the amount of the flux in the base material being greater than 0 (zero) wt. % and less than approximately 1.0 wt. %.

According to a third aspect of the present invention, there is provided a welded-aluminum alloy member which is produced by the process comprising the steps of preparing an aluminum alloy; and laser-welding the aluminum alloy by using a filler wire, the filler wire comprising a base material and a flux of Al—K—F (viz., Aluminum-potassium-fluorine)-based composition, the amount of the flux in the base material being greater than 0 (zero) wt. % and less than approximately 1.0 wt. %.

DETAILED DESCRIPTION OF THE INVENTION

For establishing the present invention, the inventors carried out Examination-1 and Examination-2, which are as follows.

Examination-1:

Several filler wires were produced and these filler wires were practically used for welding various work pieces. These work pieces thus welded were then subjected to several tests for estimating the filler wires.

As a base material of each filler wire, a powder of an Al-10%Si alloy (viz., aluminum alloy containing 10% of silicon) or a powder of an Al-1.5%Mg alloy (viz., aluminum alloy containing 1.5% of magnesium) was prepared. The powder of the aluminum alloy was mixed with a powder of flux containing $KAlF_4$, $K_2AlF_5$, $K_3AlF_6$, or a mixture of KF and $AlF_3$ to produce a powder mixture. The powder mixture thus produced was then pressed to produce a so-called green compact.

Then, the green compact was then subjected to a secondary elaboration (viz., drawing) to produce a filler wire having a diameter of 1.2 mm. By changing the amount of flux, three levels of filler wires were prepared, one containing no flux, one containing 0.5 wt. % of flux and the other one containing 2.0 wt. % of flux. More specifically, four types (viz., first, second, third and fourth types) of filler wires were produced. That is, as will be seen from TABLE-1, the first type was of a combination "Al-10%Si+0 wt. % flux", the second type was of a combination "Al-10%Si+0.5 wt. % flux", the third type was of a combination "Al-10%/Si+2.0 wt. % flux" and the fourth type was of a combination "Al-1.5%Mg+0.5 wt. % flux".

Figure 1:
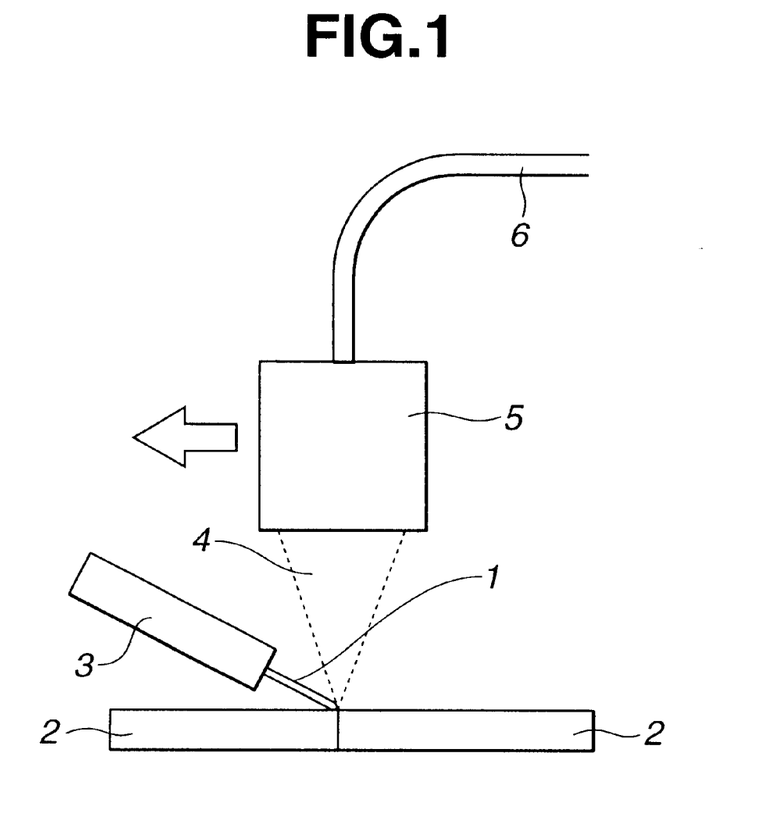
FIG. 1 is a schematic view of a laser beam welding device used for establishing the present invention.

FIG. 1 shows a laser beam welding device that was practically used for laser-welding the work pieces by using the filler wires thus produced. In operation, a laser beam 4 produced by a laser oscillator (not shown) was transmitted through a laser transmitting fiber 6 to a laser converging head 5, and the laser beam 4 from the head 5 was converged on a target point of the work piece 2. As shown, a butt welding was carried out wherein the laser beam 4 was converged on mating edges of two work pieces 2. Each filler wire 1 was supplied to the converged point of the laser beam 4 by means of a wire supplier 3, as shown. As the laser oscillator, a continuously oscillating type Nd-YAG laser oscillator was used which could deliver an output of 4 kW to the mating work pieces 2. The laser transmitting fiber 6 had a diameter of 0.6 mm. By using a collimation lens of 200 mm in focal length and a converging lens of 100 mm in focal length, the laser beam 4 was converged to have a beam diameter of 0.3 mm.

Using the above-mentioned laser beam welding device, seven work pieces 2 (more specifically, seven pairs of work pieces) were subjected to the butt welding using the four types of filler wires 1 thus prepared. For the welding, the laser output was set at 4 kW, the welding speed was set at 8.0 m/min or 6.0 m/min and the feeding speed of the filler wire 1 was matched with the welding speed.

As is seen from TABLE-1, the seven work pieces 2 to be welded were grouped into three types, which were an A6N01 type (viz., Al—Mg—Si alloy extruded plate) that was an extruded aluminum alloy plate containing magnesium (Mg) and silicon (Si), an ADC3 type (viz., Al—Si alloy die casting plate) that was an aluminum alloy die casting plate containing silicon (Si), and an A5182 type (viz., Al—Mg-based alloy plate) that was an aluminum alloy plate containing magnesium (Mg). It is to be noted that the A6N01, ADC3 and A5182 types are defined by JIS (viz., Japanese Industrial Standard)

After being subjected to the above-mentioned laser-welding, each work piece 2 was subjected to a tensile-fracturing test.

The results of the tensile-fracturing test are shown in TABLE-1. As is seen from this table, the seven work pieces thus subjected to the above-mentioned laser welding were classified into four examples 1 to 4 of the present invention and three references 1 to 3.

That is, in Example-1, the A6N01 type was used as the work piece, the second type filler wire was used and the welding speed was 8.0 m/min. In Example-2, the ADC3 type was used as the work piece, the second type filler wire was used and the welding speed was 8.0 mm/min. In Example-3, the A5182 type was used as the work piece, the fourth type filler wire was used and the welding speed was 8.0 m/min. In Example-4, the A6N01 type was used as the work piece, the fourth type filler wire was used and the welding speed was 8.0 m/min. While, in Reference-1, the A6N01 type was used as the work piece, the first type filler wire was used and the welding speed was 8.0 m/min. In Referece-2, the A6N01 type was used as the work piece, the first type filler wire was used and the welding speed was 6.0 m/min, and in Reference-3, the A6N01 type was used as the work piece, the third type filler wire was used and the welding speed was 8.0 m/min.

As is seen from TABLE-1, in Example-1 and Example-2, the fracture induced by the tensile-fracturing test appeared at the base metal not at the weld bead (viz. welded portion) and these examples showed a "good" welding quality. In Example-3, the weld bead showed a humping and the welded portion showed a slight generation of blowholes. However, in this Example-3, a fracture appeared substantially at the base metal although a part of the fracture extended to the welded portion. However, this Example-3 showed a satisfied tensile strength and was estimated "not bad" in welding quality. In Example-4, although a fracture appeared at the weld bead (viz., welded portion), satisfied tensile strength was obtained and this example was estimated "not bad" in welding quality. While, in Reference-3 that was produced by using the third type of filler wire of 2.0 wt. % flux, a fracture appeared at a boundary part between the weld bead and the base metal and a satisfied tensile strength was not obtained. Furthermore, in this Reference-3, blowholes and flux residual were found in the welded portion. In Reference-1, due to insufficient or "bad" welding, a fracture appeared at just the weld bead. In fact, in this reference, the welding did not reach the back surface of the work piece. In Reference-2, a fracture appeared at a boundary part between the weld bead and the base metal and the tensile strength was very low. In fact, in this reference, a so-called melt-down hole appeared at the welded portion.

Examination-2:

For establishing the present invention, Examination-2 was also carried out by the inventors, which is as follows.

That is, for this examination, thirty (viz., 30) same work pieces made of Al-11%Si-0.5%Mg alloy die casting plate were prepared. The alloy was an aluminum (Al) alloy containing 11% of silicon (Si) and 0.5% of magnesium (Mg). For producing such same work pieces, the following steps were carried out.

Figure 2:
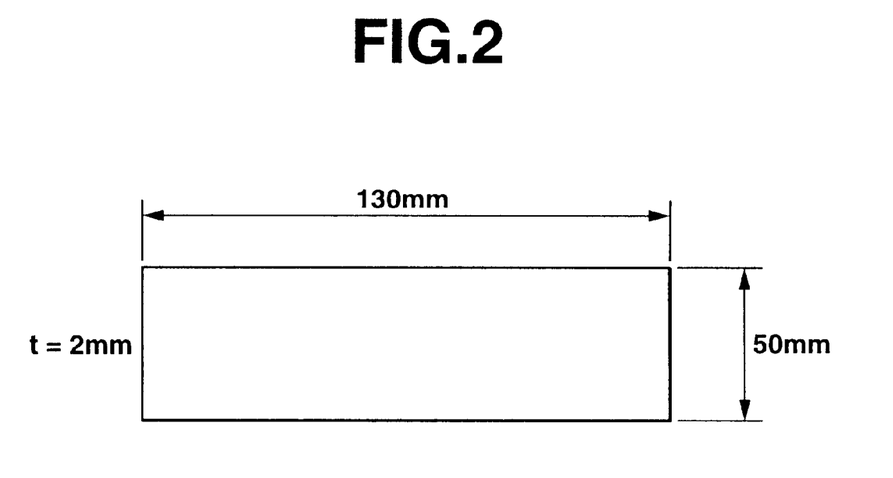
FIG. 2 is a plan view of each blank type work piece used in Examination-2 carried out for establishing the present invention.

That is, an alloy material having the above-mentioned composition was melted at a temperature of 720° C. Then, for removing inclusion and gas, the melted alloy material was subjected to a bubbling with the aid of argon gas. At the same time, for improving the eutectic Si, a certain amount of Al-10%Sr alloy (viz., aluminum alloy containing 10% of strontium (Sr)) was added to the melted alloy material by such an amount that the strontium (Sr) showed 50 ppm in the melted alloy material. Then, the melted alloy material was fed into a vacuum die casting machine having a die clamping power of 320 tons. Before die casing of the material into paired dies, surfaces of the dies were applied with a powder type releasing agent. For the die casting by the machine, the die casting pressure was set at 60 MPa and the injection speed was set at 3.5 m/s. During the die casting, the melted alloy material showed about 680° C. With these steps, thirty (viz., 30) work pieces of same size in blank type were produced. As is seen from FIG. 2, each blank type work piece had a size of 50 mm×130 mm×2 mm. Each blank type work piece showed a gas content ranging from 1 to 5 cc/10 gAl.

Then, the blank type same work pieces were kept in air at a temperature of 500° C. for a time of 3 hours and then, for achieving a solution heat treatment, they were thrown into water of room temperature. Then, after being taken out from the water, the work pieces were kept in air at a temperature of 170° C. for a time of 2 hours to carry out artificial ageing treatment. With these steps, thirty same work pieces were prepared. For ease of understanding, these same work pieces will be referred to as "reference work pieces".

Besides these reference work pieces, five filler wires were produced by using the following steps.

That is, as a base material of each filler wire, a powder of an Al-10%Si alloy (viz., aluminum alloy containing 10% of silicon) or a powder of an Al-1.5%Mg alloy (viz., aluminum alloy containing 1.5% of magnesium) was prepared. The powder of the aluminum alloy was mixed with a powder flux of fluoride group to produce a powder mixture. The powder mixture was then pressed to produce to a green compact.

Then, the green compact was subjected to a secondary elaboration to produce a filler wire having a diameter of 1.2 mm. By changing the amount of flux, five levels of filler wires were prepared, one containing no flux, one containing 0.5 wt. % of flux, one containing 1.0 wt. % of flux, one containing 2.0 wt. % of flux and the other containing 3.0 wt. % of flux. More specifically, five types (viz., first, second, third, fourth and fifth types) of filler wires were produced. That is, as will be seen from TABLE-2, the first type was of a combination of "Al-10%Si +0 wt. % flux", the second type was of a combination of "Al-10%Si+0.5 wt. % flux", the third type was of a combination of "Al-10%Si+1.0 wt. % flux", the fourth type was of a combination of "Al-10%Si+ 2.0 wt. % flux" and the fifth type was of a combination of "Al-10%Si+3.0 wt. % flux".

Figure 3A:
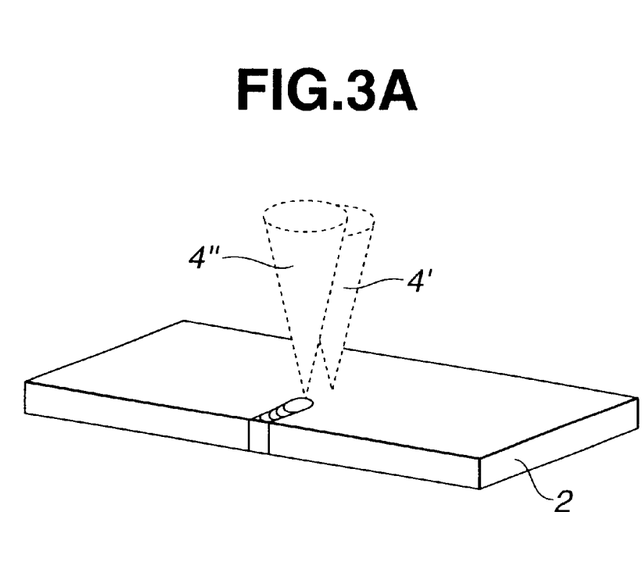
FIGS. 3A and 3B are views showing a welding condition taken in the Examination-2.
Figure 3B:
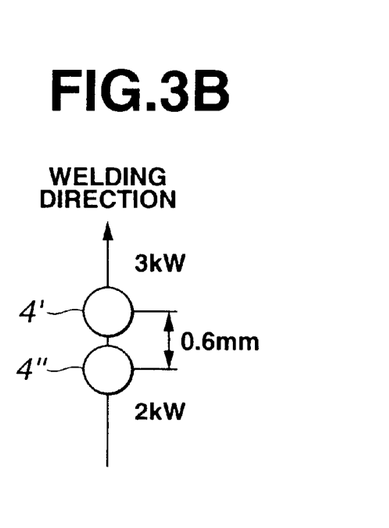

After being polished by a brush of Nylon (trade name) and degreased by alcohol, all of the reference work pieces were subjected to a laser-welding by using the five types of filler wires. For this laser-welding, the above-mentioned laser beam welding device shown in FIG. 1 was used. However, in the Example-2, in operation, as is seen from FIGS. 3A and 3B, two laser beams 4' and 4" of outputs 3 kW and 2 kW from the laser converging head 5 were used, which were converged on two points on the surface of each reference work piece 2. The distance between the two points was 0.6 mm. During a bead-on welding, each filler wire was supplied to the two points by means of the wire supplier 3. The welding speed was set at 6 m/min and the feeding speed of the filler wire was set at 5.3 m/min.

As is seen from TABLE-2, the thirty work pieces thus welded were classified into the group of Example-5 of the present invention and the groups of References-4 to 7, each group including six work pieces.

As is described hereinabove, before being subjected to the welding, the thirty work pieces of the groups of Example-5, Reference-4, Reference-5, Reference-6 and Reference-7 were the same reference work pieces. However, as is seen from TABLE-2, for welding the six work pieces of Example-5, the above-mentioned second type filler wire was used. For welding the six work pieces of Reference-4, the third type filler wire was used. For welding the six work pieces of Reference-5, the fourth type filler wire was used. For welding the six work pieces of Reference-6, the fifth type filler wire was used. For welding the six work pieces of Reference-7, the first type filler wire was used.

Figure 4:
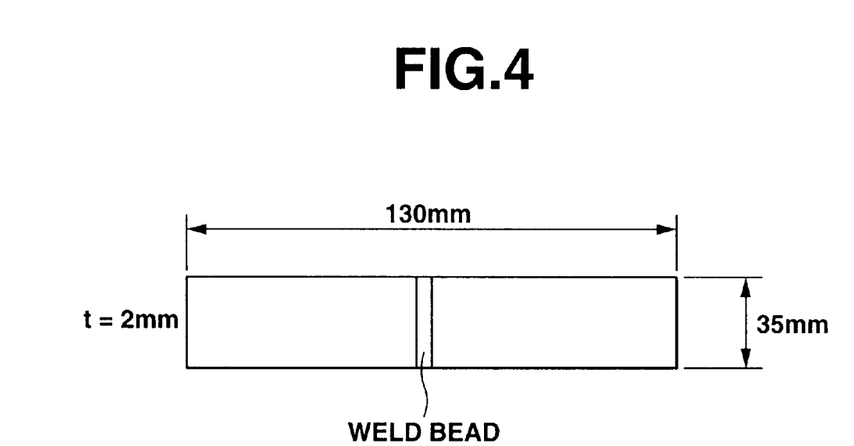
FIG. 4 is a plan view of each test piece produced as a result of the Examination-2, the test piece being subjected to a tensile test.

From the thirty work pieces which were subjected to the above-mentioned bead-on welding, respective test pieces were cut out, each having a size of 35 mm×130 mm×2 mm, as is seen from FIG. 4. Each test piece was machined to remove excess weld metal from the weld bead (viz., welded portion). The test pieces were then subjected to a tensile-fracturing test by using an Instron type testing machine. The speed of testing rate was 5 mm/min.

The results of the tensile-fracturing test are shown in TABLE-2. After the tensile-fracturing test, each of the test pieces of a group which was fractured at the weld bead (viz., welded portion) was subjected to an image analysis to derive a porosity per area of the welded portion. The area for the measurement was 25 mm². However, the test pieces of the other group which was fractured at a portion other than the weld bead were not subjected to the image analysis. The results of the image analysis are shown in TABLE-2.

As is seen from TABLE-2, the six test pieces of Example-1 showed the tensile strength ranging from 236 MPa to 275 MPa. Three of them showed the fracture in a boundary face between the weld bead and the base metal. The other three showed the fracture in the weld bead. However, these three test pieces showed a very small porosity, that is, 4.7% or 4.8%. In case of Reference-4, the six test pieces showed the tensile strength ranging from 203 MPa to 291 MPa. One of them showed a fracture in the boundary face between the weld bead and the base metal, and five of them showed a fracture in the weld bead. These five test pieces showed the porosity ranging from 5.0% to 11.4%. In case of Reference-5, the six test pieces showed the tensile strength ranging from 211 MPa to 289 MPa. One of them showed a fracture in the boundary face between the weld bead and the base metal, and five of them showed a fracture in the weld bead. These five test pieces showed the porosity ranging from 7.8% to 11.9%. In case of Reference-6, the six test pieces showed the tensile strength ranging from 228 MPa to 291 MPa. Four of them showed a fracture in the boundary face between the weld bead and the base metal, and two of them showed the fracture in the weld bead. These two test pieces showed the porosity, viz., 12.1% and 4.7%, respectively. In case of Reference-7, the six test pieces showed the tensile strength ranging from 233 MPa to 289 MPa. One of them showed a fracture in the boundary face between the weld bead and the base metal, and the other five showed a fracture in the weld bead. These five test pieces showed the porosity ranging from 10.7% to 13.5%.

Figure 5:
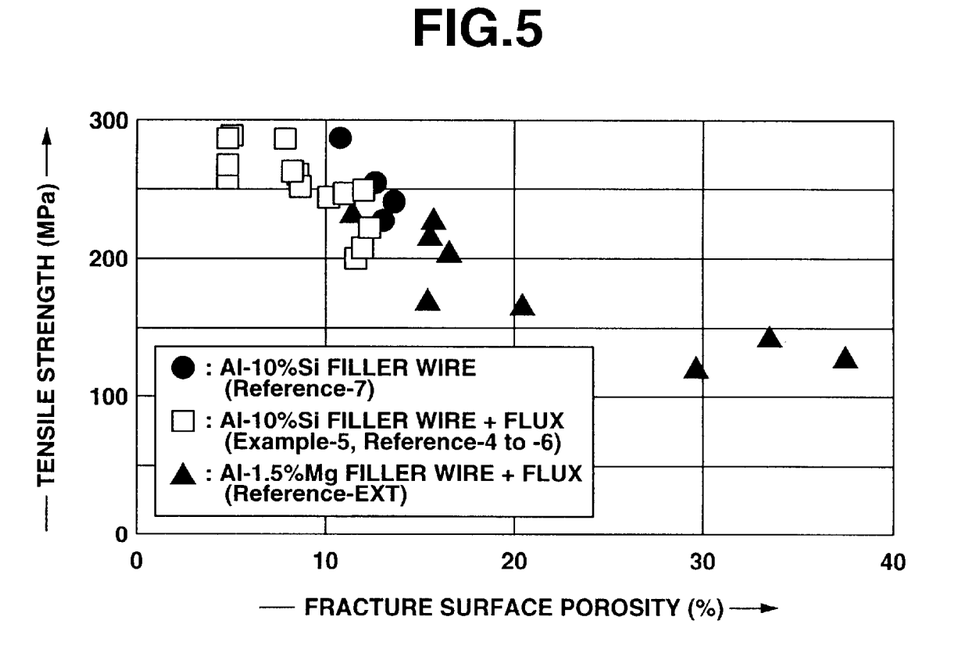
FIG. 5 is a graph showing a mechanical strength of the test pieces produced as a result of the Examination-2, in terms of a relationship between a fracture surface porosity per area and a tensile strength.

FIG. 5 is a graph showing a relationship between the fracture surface porosity and the tensile strength. That is, shown by small black circles "●" are the data provided by the test pieces of Reference-7, shown by small white squares "□" are the data provided by the test pieces of Example-5 and Reference-4 to Reference-6, and shown by small black triangles "▲" are the data provided by test pieces of an extra reference (viz., Reference-EXT). In this extra reference, the work pieces were the same as the above-mentioned reference work pieces, but these work pieces were subjected to the laser-welding by using a filler wire constructed of a combination "AL-1.5%Mg+0.5 to 2.0 wt. % of flux".

Figure 6:
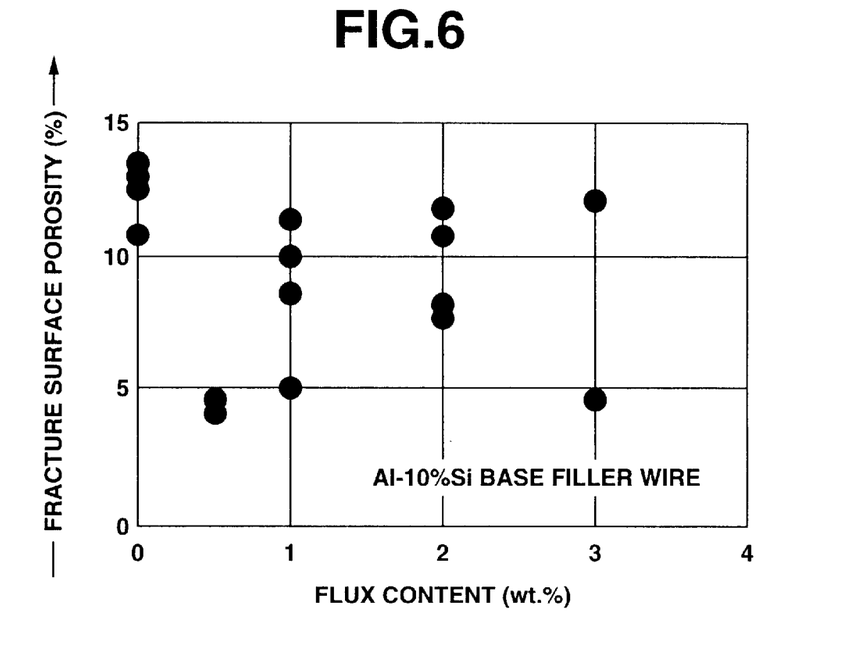
FIG. 6 is a graph showing a relationship between the fracture surface porosity per area and an amount of flux, in case of test pieces of a group using an Al-10%Si alloy as a base material for the filler wire.

FIG. 6 is a graph showing a relationship between the flux content and the fracture surface porosity.

Figure 7:
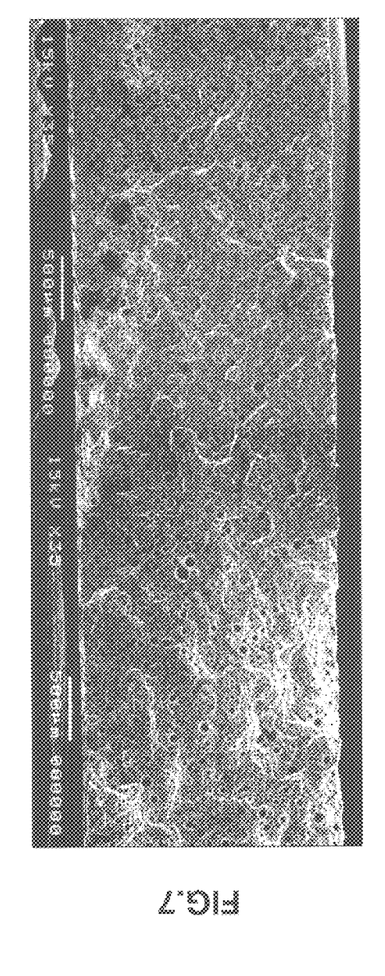
FIG. 7 is a SEM (scanning electron microscope) photo of a fractured surface of a welded portion of a work piece that was produced by using an Al-10%Si-based filler wire containing 0.5% of flux.
Figure 8:
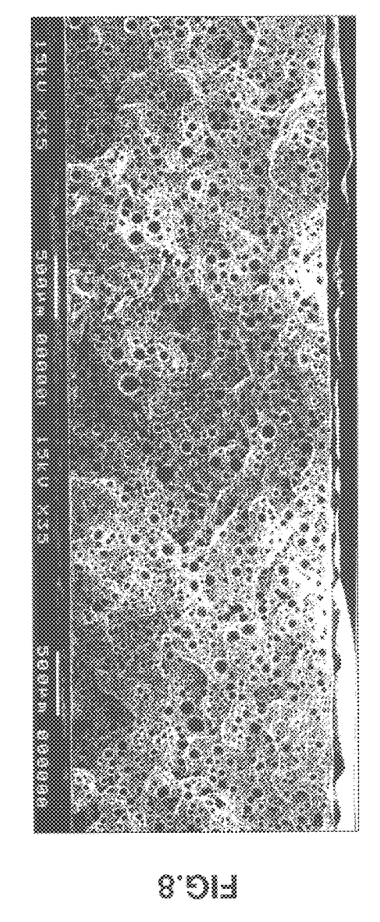
FIG. 8 is a SEM photo of a fractured surface of a welded portion of another work piece that was produced by using an Al-10%Si-based filler wire containing no flux.

FIGS. 7 and 8 are SEM (scanning electron microscope) photos of the test pieces of Example-5 and Reference-7 respectively, showing the microstructure of a fractured section.

As is seen from the graph of FIG. 5, it is recognized that with increase of the porosity, the tensile strength lowers. However, when the porosity is less than 10%, substantial lowering of the tensile strength is not recognized. Furthermore, in case of the test pieces showing the data "□" (viz., provided by Example-5, and Reference-4 to Reference-6), lowering of the tensile strength is recognized in a smaller porosity than in case of those showing the data "●" (viz., provided by Reference-7). This is because of an inclusion in the welded portion caused by over 1 wt. % of flux in the filler wire. The microstructure of FIG. 7 shows such inclusion in the welded portion. When comparing the data "□" provided by the test pieces of Example-5, and Reference-4 to Reference-6 with the data "▲" provided by the test pieces of the extra reference (viz., Reference-EXT), it is recognized that the former test pieces "□" show less porosity than the latter test pieces "▲". This is because the vaporization of "Mg" in the filler wire "▲" occurs much easier than that of "Si" in the filler wire "□".

As is seen from the graph of FIG. 6, in case of the filler wire that used "Al-10%Si alloy" as a base material, suppression of blowholes is assuredly made when the flux content shows 0.5 wt. %. As is described hereinabove, when having an inclusion caused by the flux in the filler wire, lowering of mechanical strength of the welded portion is induced. Thus, when using "AL-10%Si alloy" as the base material, it is necessary to control the amount of flux in the alloy (viz., base material) within a range from approximately 0.05 wt. % to approximately 1.0 wt. %. More specifically, the amount of the flux in the base material is greater than 0 (zero) wt. % and less than approximately 1.0 wt. %.

In the following, the present invention will be summarized with respect to the above-mentioned examinations that were carried out by the inventors.

The filler wire according to the present invention generally comprises a base material and a flux of Al—K—F (viz., Aluminum-potassium-fluorine)-based composition. The amount of the flux in the base material is greater than 0 (zero) wt. % and less than approximately 1.0 wt. %. Due to inclusion of the Al—K—F-based flux, during the welding, the filler wire can exhibit deoxidation effect, lower the hydrogen partial pressure owing to the existence of K and F and improve outgassing occurring when the viscosity of the welded alloy is lowered, and thus, generation of undesired blowholes in the welded portion is assuredly suppressed or at least minimized.

As the Al—K—F based flux, $KAlF_4$, $K_2AlF_5$, $K_3AlF_6$, a mixture of KF and $AlF_3$, an eutectic composition of KF and $AlF_3$, or a fluoride-based composition such as potassium fluoroaluminate complex may be used. The material $KAlF_4$, $K_2AlF_5$, or $K_3AlF_6$ are generally represented by "$K_\alpha AlF_{\alpha+3}$" wherein α is an integer equal to or greater than 1. The fluoride-based compositions may be a mixture of different compositions.

As is mentioned hereinabove, in the present invention, the amount of the flux in the base material is controlled to be greater than 0 (zero) wt. % and less than approximately 1.0 wt. %. If the flux content is 0 (zero) wt. %, the suppression effect against blowholes becomes very poor, and if the flux content exceeds 1.0 wt. %, undesired inclusion caused by the flux tends to appear in the welded portion. Preferably, the flux content is not less than 0.05 wt. %.

The base material for the filler wire is an Al—Si-based alloy. However, if desired, an Al—Mg-based alloy may be used as the base material for the filler wire in place of Al—Si-based alloy. However, in case of Al—Mg-based alloy, the amount of flux should increase for achieving a satisfied suppression effect against the blowholes because during welding, the vapor of Mg in the base material and flux composition react to cause generation of the blowholes. As the base material for the filler wire, Al-10%Si alloy, JIS-4043 alloy or JIS-4047 alloy or a combination of these alloys is preferable.

In the method for welding a work piece of aluminum alloy, according to the present invention, the work piece is prepared and then the work piece is subjected to a laser-welding by using the above-mentioned filler wire of the present invention. With this method, there is produced a welded-aluminum alloy member whose welded portion shows a less porosity and adequate tensile strength and ductility. In place of the laser welding, other welding, such as metal inert gas (MIG) welding, electron beam welding or the like may be used.

As the work piece (viz., base metal) to which the laser welding is to be applied, Al—Si-based alloy or Al—Mg—Si-based alloy is preferable. That is, if Al—Mg-based alloy or Al—Zn-based alloy, which contains a low boiling point element, is used as the work piece, undesired sputtering tends to occur during welding.

The work piece (viz., base metal) used in the present invention may be produced through various methods, which are for example, extrusion method, rolling method, press method, casting method and die casting method. However, the work piece produced through the casting method or die casting method is preferable because hitherto, suppression to the blowholes in such work piece has been difficult. More specifically, usage of an aluminum alloy casting work piece or an aluminum alloy die casting work piece is preferable in the present invention.

If the welded portion of the welded-aluminum alloy member shows the porosity less than 10%, it can be estimated that the welded portion has a satisfied tensile strength.

The entire contents of Japanese Patent Application 2000-175258 (filed Jun. 12, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above description.

TABLE 1

| Invention/Reference | Work piece | Filler wire Base material | Amount of flux (wt %) | Welding speed (m/min) | Fractured portion | Welding quality |
|---|---|---|---|---|---|---|
| Example-1 | A6N01 (Al-Mg-Si) | Al-10% Si | 0.5 | 8.0 | Base metal | Good |
| Example-2 | ADC3 (Al-Si die casting) | Al-10% Si | 0.5 | 8.0 | Base metal | Good |
| Example-3 | A5182 (Al-Mg) | Al-1.5% Mg | 0.5 | 8.0 | Weld bead - Base metal | Not bad |
| Example-4 | A6N01 | Al-1.5% Mg | 0.5 | 8.0 | Weld bead | Not bad |
| Reference-1 | A6N01 | Al-10% Si | 0 | 8.0 | Weld bead | Bad |
| Reference-2 | A6N01 | Al-10% Si | 0 | 6.0 | Weld bead - Base metal | Bad |
| Reference-3 | A6N01 | Al-10% Si | 2.0 | 8.0 | Weld bead - Base metal | Flux residual |

TABLE 2

| Invention/Reference | Work piece | Base material | Amount of flux (wt %) | Tensile strength (MPa) | Fractured portion | Fracture Filler wire Tensile test surface porosity per area (%) |
|---|---|---|---|---|---|---|
| Example-5 | Reference | Al-10% Si (2nd type) | 0.5 | 263 | Weld bead | 4.7 |
| | | | | 270 | Weld bead | 4.7 |
| | | | | 249 | Weld bead - Base metal | — |
| | | | | 266 | Weld bead - Base metal | — |
| | | | | 236 | Weld bead- Base metal | — |
| | | | | 275 | Weld bead | 4.8 |
| Reference-4 | Reference | Al-10% Si (3rd type) | 1.0 | 265 | Weld bead | 8.5 |
| | | | | 203 | Weld bead | 11.4 |
| | | | | 248 | Weld bead | 10.0 |
| | | | | 271 | Weld bead - Base metal | — |
| | | | | 291 | Weld bead | 5.0 |
| | | | | 255 | Weld bead | 8.6 |
| Reference-5 | Reference | Al-10% Si (4th type) | 2.0 | 211 | Weld bead | 11.9 |
| | | | | 265 | Weld bead | 8.1 |
| | | | | 289 | Weld bead | 7.8 |
| | | | | 252 | Weld bead | 11.9 |
| | | | | 249 | Weld bead | 10.9 |
| | | | | 269 | Weld bead - Base metal | — |
| Reference-6 | Reference | Al-10% Si (5th type) | 3.0 | 228 | Weld bead | 12.2 |
| | | | | 255 | Weld bead - Base metal | — |
| | | | | 289 | Weld bead | 4.7 |
| | | | | 291 | Weld bead - Base metal | — |
| | | | | 262 | Weld bead- Base metal | — |
| | | | | 262 | Weld bead - Base metal | — |

TABLE 2-continued

| Invention/ Reference | Work piece | Base material | Amount of flux (wt %) | Tensile strength (MPa) | Fractured portion | Fracture Filler wire Tensile test surface porosity per area (%) |
|---|---|---|---|---|---|---|
| Reference-7 | Reference | Al-10% Si (1st type) | 0 | 233 | Weld bead | 13.0 |
| | | | | 258 | Weld bead | 12.5 |
| | | | | 246 | Weld bead | 13.5 |
| | | | | 289 | Weld bead | 10.7 |
| | | | | 245 | Weld bead - Base metal | — |
| | | | | 258 | Weld bead | 12.5 |

What is claimed is:

1. A filler wire for laser-welding an aluminum alloy, comprising:

a base material; and a flux of Al—K—F composition, wherein the amount of said flux in said base material is greater than 0 wt. % and less than approximately 1.0 wt. %.

2. A filler wire as claimed in claim 1, in which the amount of the flux in the base material is not less than 0.05 wt. %.

3. A filler wire as claimed in claim 2, in which the amount of the flux in the base material is approximately 0.5 wt. %.

4. A filler wire as claimed in claim 1, in which said base material is an Al—Si-based alloy.

5. A filler wire as claimed in claim 4, in which said base material is selected from at least one of the materials of the group consisting of Al-10%Si alloy, JIS-4043 alloy and JIS-4047 alloy.

6. A filler wire as claimed in claim 1, in which said flux is selected from at least one of the materials of the group consisting of $KAlF_4$, $K_2AlF_5$, $K_3AlF_6$, a mixture of KF and $AlF_3$, an eutectic composition of KF and $AlF_3$, and a potassium fluoroaluminate complex.

7. A method of welding a work piece of aluminum alloy, comprising:

preparing the work piece of aluminum alloy; and laser-welding said work piece by using a filler wire, said filler wire comprising a base material and a flux of Al—K—F-based composition, the amount of said flux in said base material being greater than 0 wt. % and less than approximately 1.0 wt. %.

8. A method as claimed in claim 7, in which said work piece to be welded is an Al—Si-based alloy or an Al—Mg—Si-based alloy.

9. A method as claimed in claim 8, in which the laser welding is carried out under a condition wherein the laser output is approximately 4.0 kW, welding speed is approximately 6.0 to 8.0 m/min and feeding speed of the filler wire is approximately 6.0 to 8.0 m/min.

10. A method as claimed in claim 7, in which said work piece to be welded is an Al-11%Si-0.5% die casting alloy, and in which the laser welding is carried out under a condition wherein double laser beams having outputs of approximately 3.0 kW and 2.0 kW are converged on the work piece, the distance between the double laser beams is approximately 0.6 mm, welding speed is approximately 6.0 m/min and feeding speed of the filler wire is approximately 5.3 m/min.

11. A welded-aluminum alloy member produced by the process comprising the steps of preparing an aluminum alloy; and laser-welding said aluminum alloy by using a filler wire, said filler wire comprising a base material and a flux of Al—K—F-based composition, the amount of said flux in said base material being greater than 0 wt. % and less than approximately 1.0 wt. %.

12. A welded-aluminum alloy member as claimed in claim 11, in which said aluminum alloy is an aluminum alloy casting member or aluminum alloy die casting member.

13. A welded-aluminum alloy member as claimed in claim 11, in which the porosity at a welded portion of the aluminum alloy is less than 10%.

* * * * *